(12) United States Patent
Sullivan et al.

(10) Patent No.: US 11,577,901 B2
(45) Date of Patent: Feb. 14, 2023

(54) CONTAINER ASSEMBLY FOR FLOWABLE MATERTALS

(71) Applicant: CDF Corporation, Plymouth, MA (US)

(72) Inventors: Joseph Sullivan, Plymouth, MA (US); James Plunkett, Plymouth, MA (US)

(73) Assignee: CDF Corporation, Plymouth, MA (US)

( * ) Notice: Subject to any disclaimer, the term of this patent is extended or adjusted under 35 U.S.C. 154(b) by 0 days.

(21) Appl. No.: 17/240,079

(22) Filed: Apr. 26, 2021

(65) Prior Publication Data

US 2022/0073248 A1 Mar. 10, 2022

Related U.S. Application Data

(63) Continuation of application No. 16/442,242, filed on Jun. 14, 2019, now Pat. No. 10,988,298.

(60) Provisional application No. 62/685,695, filed on Jun. 15, 2018.

(51) Int. Cl.
*B65D 77/06* (2006.01)
*B65D 25/42* (2006.01)
*B65D 88/60* (2006.01)

(52) U.S. Cl.
CPC ........... *B65D 77/065* (2013.01); *B65D 25/42* (2013.01); *B65D 88/60* (2013.01)

(58) Field of Classification Search
CPC ...... B65D 77/065; B65D 25/42; B65D 88/60; B65D 88/26; B65D 80/046; B65D 25/16; B65D 83/06; Y02W 30/80

USPC ......... 222/105, 185.1, 526–529; 220/495.01, 220/495.06–495.11
See application file for complete search history.

(56) References Cited

U.S. PATENT DOCUMENTS

| | | | |
|---|---|---|---|
| 2,789,844 A | 4/1957 | Kessler | |
| 4,863,339 A * | 9/1989 | Krein | B65D 90/046 414/373 |
| 5,067,636 A | 11/1991 | Pfeiffer et al. | |
| 5,072,857 A | 12/1991 | Coleman | |
| 5,154,308 A | 10/1992 | Larson | |
| 5,163,485 A | 11/1992 | Hermann | |
| 6,354,636 B2 | 3/2002 | Matsuzawa et al. | |

(Continued)

*Primary Examiner* — Lien M Ngo
(74) *Attorney, Agent, or Firm* — Pandiscio & Pandiscio

(57) ABSTRACT

A container assembly for flowable materials, the container assembly comprising: a reusable outer supporting container; and a disposable inner plastic liner; wherein the reusable outer supporting container comprises an outlet pipe comprising a first outlet pipe section connected to the reusable outer supporting container and a second outlet pipe section releasably connectable to the first outlet pipe section, wherein the second outlet pipe section comprises a valve for selectively closing off the second outlet pipe section, and wherein at least one of the first outlet pipe section and the second outlet pipe section comprises an annular recess; and wherein the disposable inner plastic liner comprises a tubular outlet portion, wherein the tubular outlet portion comprises an outer flange configured to be captured between the first outlet pipe section and the second outlet pipe section, and further wherein the outer flange of the tubular outlet portion comprises an annular protrusion configured to be received in the annular recess when the outer flange is captured between the first outlet pipe section and the second outlet pipe section.

12 Claims, 10 Drawing Sheets

(56) References Cited

U.S. PATENT DOCUMENTS

| | | | |
|---|---|---|---|
| 6,840,407 B2* | 1/2005 | Lassota | B67D 3/00 222/462 |
| 6,988,639 B2 | 1/2006 | Arch | |
| 7,578,530 B2 | 8/2009 | Eriksson et al. | |
| 9,546,039 B1 | 1/2017 | Lawrence | |
| 9,751,690 B2 | 9/2017 | Lawrence | |
| 2001/0023572 A1* | 9/2001 | Savage | B65D 77/06 53/449 |
| 2007/0284389 A1* | 12/2007 | Jacobs | B67D 3/04 222/105 |
| 2009/0212071 A1* | 8/2009 | Tom | B65B 31/003 222/105 |
| 2011/0198353 A1* | 8/2011 | Tsao | A61M 1/63 220/203.28 |
| 2014/0131380 A1* | 5/2014 | Pethe | B67D 1/045 222/105 |

* cited by examiner

TOP VIEW

SIDE VIEW

CROSS SECTION

CONTAINER ASSEMBLY FOR FLOWABLE MATERTALS

REFERENCE TO PENDING PRIOR PATENT APPLICATIONS

This patent application is a continuation of pending prior U.S. patent application Ser. No. 16/442,242, filed Jun. 14, 2019 by CDF Corporation for CONTAINER ASSEMBLY FOR FLOWABLE MATERIALS, which patent application in turn claims benefit of prior U.S. Provisional Patent Application Ser. No. 62/685,695, filed Jun. 15, 2018 by CDF Corporation and Joseph Sullivan et al. for CONTAINER ASSEMBLY FOR FLOWABLE MATERIALS.

The two (2) above-identified patent applications are hereby incorporated herein by reference.

FIELD OF THE INVENTION

This invention relates to containers in general, and more particularly to containers for flowable materials.

BACKGROUND OF THE INVENTION

In many situations it may be necessary and/or desirable to package flowable materials (e.g., liquids, pulverized solids, etc.) in individual containers. And in many situations it may be desirable to re-use the containers (or at least some part of the containers) after the flowable materials have been discharged from the containers. And in many situations, cleaning the container after discharge of the flowable materials may be expensive, time-consuming and/or inconvenient.

To this end, container assemblies have been developed which comprise a reusable outer supporting container and a disposable inner plastic liner. The reusable outer supporting container typically has a removable top cover for allowing the disposable inner plastic liner to be inserted into the interior of the reusable outer supporting container. And the reusable outer supporting container typically has an outlet pipe on its lower end for receiving a tubular outlet portion of the disposable inner plastic liner, with the outlet pipe having a valve disposed therein for selectively closing off flow through the outlet pipe.

On account of the foregoing construction, the disposable inner plastic liner can be positioned within the interior of the reusable outer supporting container, with the tubular outlet portion of the disposable inner plastic liner being disposed in the outlet pipe of the reusable outer supporting container; the valve in the outlet pipe can be closed off; and the disposable inner plastic liner can be filled with the flowable material, with the reusable outer supporting container providing support for the weight of the flowable material contained within the disposable inner plastic liner. The flowable material can then be maintained within the container assembly, e.g., for storage and/or shipping. When the flowable material is to thereafter be removed from the container assembly, the valve in the outlet pipe of the reusable outer supporting container is opened and the flowable material is dispensed out of the container assembly. Thereafter, the disposable inner plastic liner can be stripped out of the reusable outer supporting container, a new disposable inner plastic liner can be positioned within the interior of the reusable outer supporting container, and then fresh flowable material can be flowed into the disposable inner plastic liner.

In practice, the aforementioned outlet pipe of the reusable outer supporting container is typically formed in two pieces: a first outlet pipe section permanently affixed to the reusable outer supporting container, and a second outlet pipe section containing the aforementioned valve, with the first outlet pipe section being releasably connected to the second outlet pipe section with a clamp. In this way the second outlet pipe section, containing the aforementioned valve, can be easily disconnected from the first outlet pipe section (and hence can be easily disconnected from the reusable outer supporting container) for cleaning and/or replacement purposes. And in practice, the aforementioned tubular outlet portion of the disposable inner plastic liner typically has a flange on its outer end which is captured between the first outlet pipe section and the second outlet pipe section when the second outlet pipe section is clamped to the first outlet pipe section. See, for example, U.S. Pat. No. 5,163,485, issued Nov. 17, 1992 to Sotralentz S. A. and Francis Hermann for CONTAINER ASSEMBLY FOR FLOWABLE MATERIALS, which patent is hereby incorporated herein by reference. And in practice, an O-ring is typically disposed between the clamped first outlet pipe section and the second outlet pipe section in order to ensure a good seal.

Unfortunately, this arrangement, and particularly the handling of the O-ring during clamping of the second outlet pipe section to the first outlet pipe section, and during unclamping of the second outlet pipe section from the first outlet pipe section, has proven to be cumbersome and inconvenient.

Therefore a new approach is needed.

SUMMARY OF THE INVENTION

The present invention comprises the provision and use of a novel container assembly for flowable materials which improves upon the prior art.

In one form of the invention, there is provided a container assembly for flowable materials, the container assembly comprising:
  a reusable outer supporting container; and
  a disposable inner plastic liner;
  wherein the reusable outer supporting container comprises an outlet pipe comprising a first outlet pipe section connected to the reusable outer supporting container and a second outlet pipe section releasably connectable to the first outlet pipe section, wherein the second outlet pipe section comprises a valve for selectively closing off the second outlet pipe section, and wherein at least one of the first outlet pipe section and the second outlet pipe section comprises an annular recess; and
  wherein the disposable inner plastic liner comprises a tubular outlet portion, wherein the tubular outlet portion comprises an outer flange configured to be captured between the first outlet pipe section and the second outlet pipe section, and further wherein the outer flange of the tubular outlet portion comprises an annular protrusion configured to be received in the annular recess when the outer flange is captured between the first outlet pipe section and the second outlet pipe section.

In another form of the invention, there is provided a method for storing and releasing flowable materials, the method comprising:
  providing a container assembly comprising:
  a reusable outer supporting container; and
  a disposable inner plastic liner;
  wherein the reusable outer supporting container comprises an outlet pipe comprising a first outlet pipe section connected to the reusable outer supporting container and a second outlet pipe section releasably connectable to the first outlet pipe section, wherein the second outlet pipe section comprises a valve for selectively closing off the second outlet pipe section, and wherein at least one of the first outlet pipe section and the second outlet pipe section comprises an annular recess; and wherein the disposable inner plastic liner comprises a tubular outlet portion, wherein the tubular outlet portion comprises an outer flange configured to be captured between the first outlet pipe section and the second outlet pipe section, and further wherein the outer flange of the tubular outlet portion comprises an annular protrusion configured to be received in the annular recess when the outer flange is captured between the first outlet pipe section and the second outlet pipe section;

positioning the disposable inner plastic liner within the reusable outer supporting container, with the tubular outlet portion of the disposable inner plastic liner being disposed within the outlet pipe so that the outer flange of the tubular outlet portion is captured between the first outlet pipe section and the second outlet pipe section, and with the annular protrusion of the disposable inner plastic liner being received in the annular recess of the outlet pipe;

loading flowable material into the disposable inner plastic liner while the valve of the outlet pipe is closed; and releasing the flowable material from the disposable inner plastic liner by opening the valve of the outlet pipe.

In another form of the invention, there is provided a disposable inner plastic liner for disposition within a reusable outer supporting container of a container assembly for flowable materials, wherein the reusable outer supporting container comprises an outlet pipe comprising a first outlet pipe section connected to the reusable outer supporting container and a second outlet pipe section releasably connectable to the first outlet pipe section, wherein the second outlet pipe section comprises a valve for selectively closing off the second outlet pipe section, and wherein at least one of the first outlet pipe section and the second outlet pipe section comprises an annular recess, the disposable inner plastic liner comprising:

a tubular outlet portion, wherein the tubular outlet portion comprises an outer flange configured to be captured between the first outlet pipe section and the second outlet pipe section, and further wherein the outer flange of the tubular outlet portion comprises an annular protrusion configured to be received in the annular recess when the outer flange is captured between the first outlet pipe section and the second outlet pipe section.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein.

DETAILED DESCRIPTION OF THE PREFERRED EMBODIMENT

Figure 1:
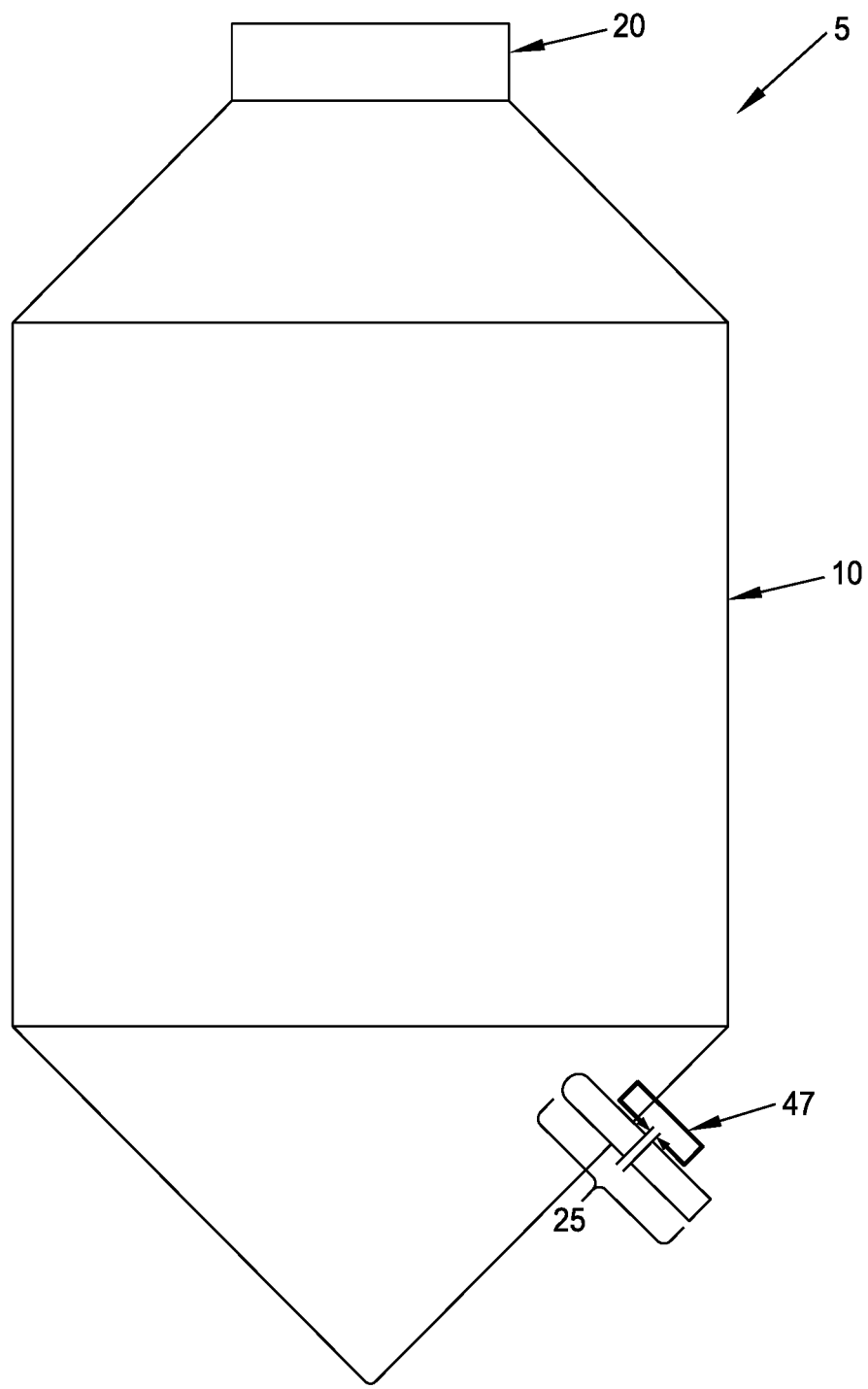
FIG. 1 is a schematic view of a container assembly formed in accordance with the present invention.
Figure 2:
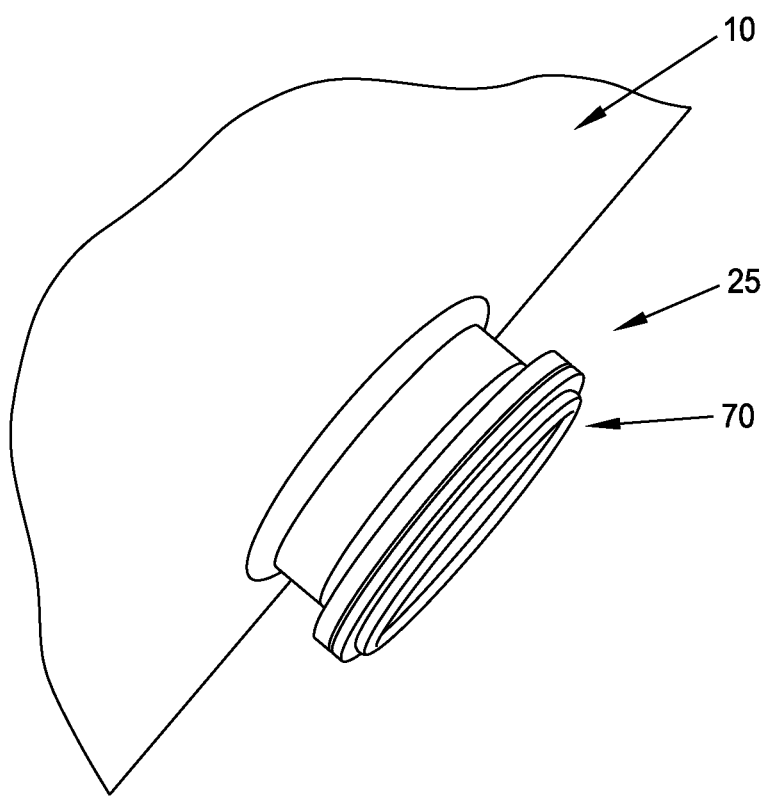
FIG. 2 is an enlarged view of a portion of the container assembly of FIG. 1, showing the tubular outlet portion of the disposable inner plastic liner protruding from the first outlet pipe section of the reusable outer supporting container.
Figure 3:
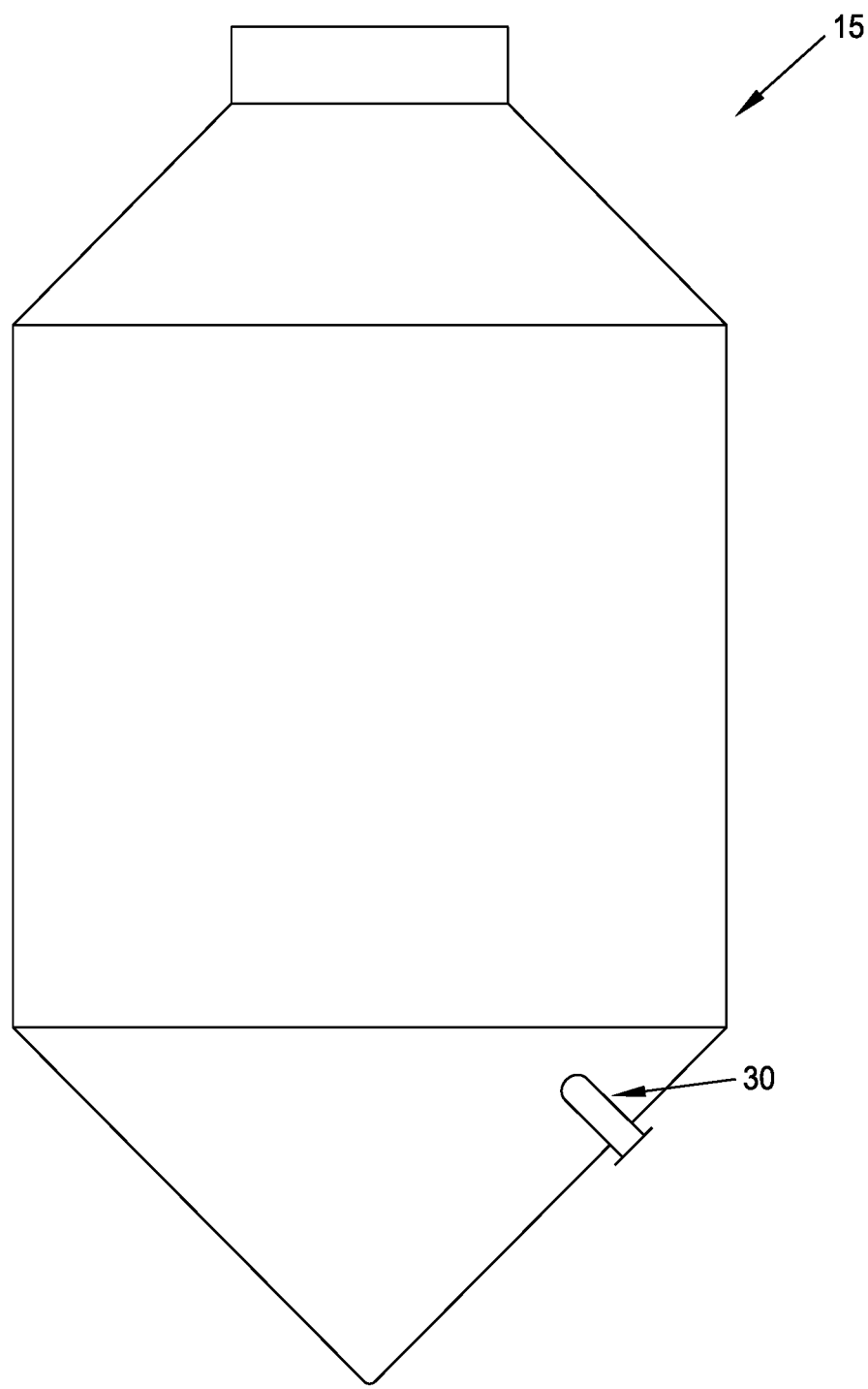
FIG. 3 is a schematic view of the disposable inner plastic liner.
Figure 4:
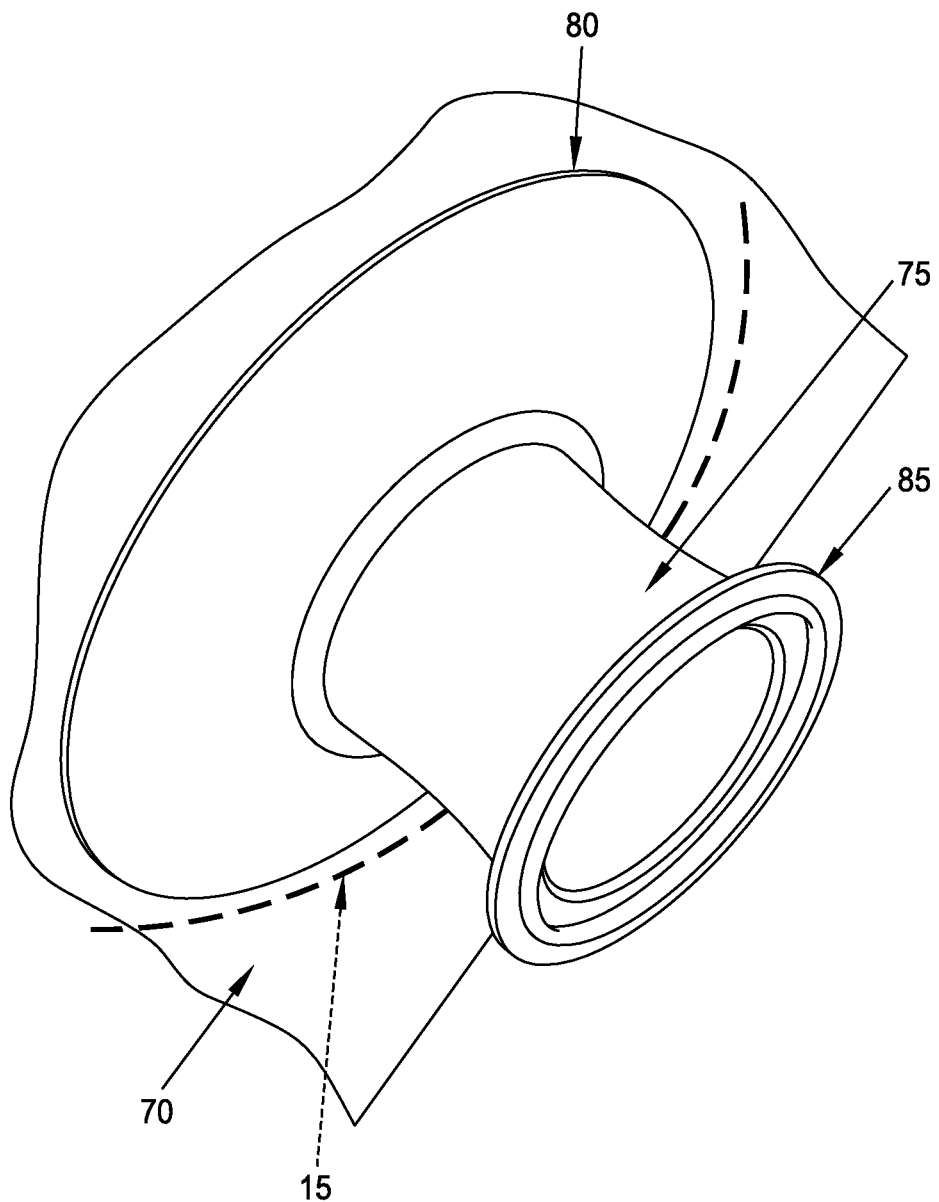
FIG. 4 is a schematic view showing details of the construction of the disposable inner plastic liner, including the tubular outlet portion of the disposable inner plastic liner.
Figure 5:
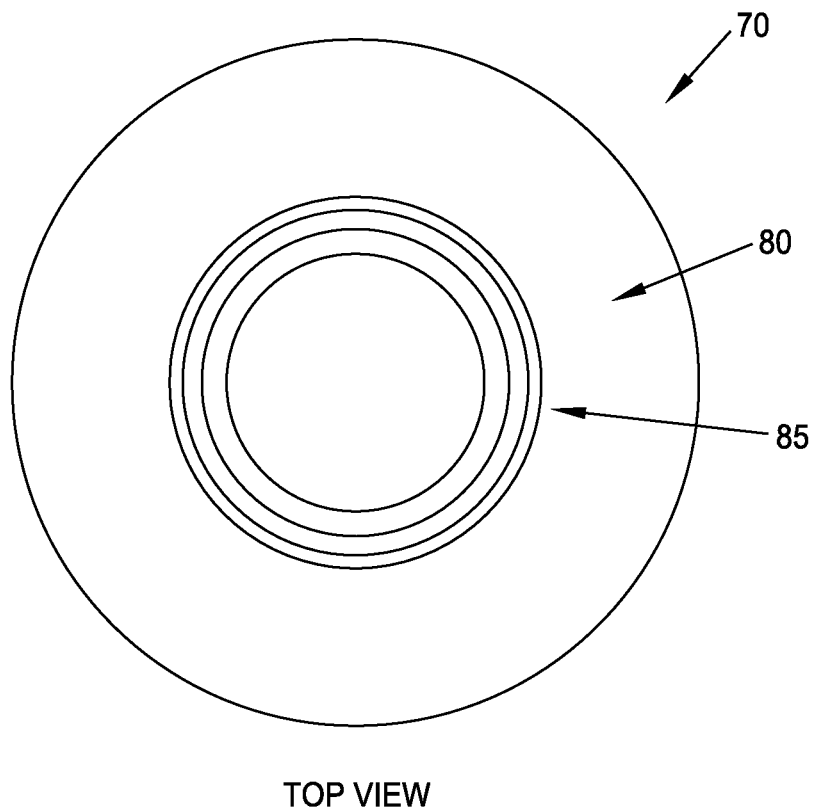
FIGS. 5-7 are schematic views showing details of the tubular outlet portion of the disposable inner plastic liner.
Figure 6:
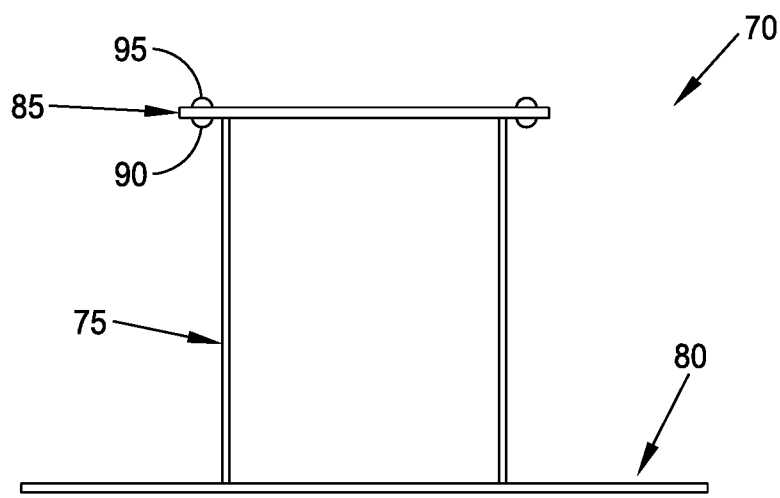
Figure 7:
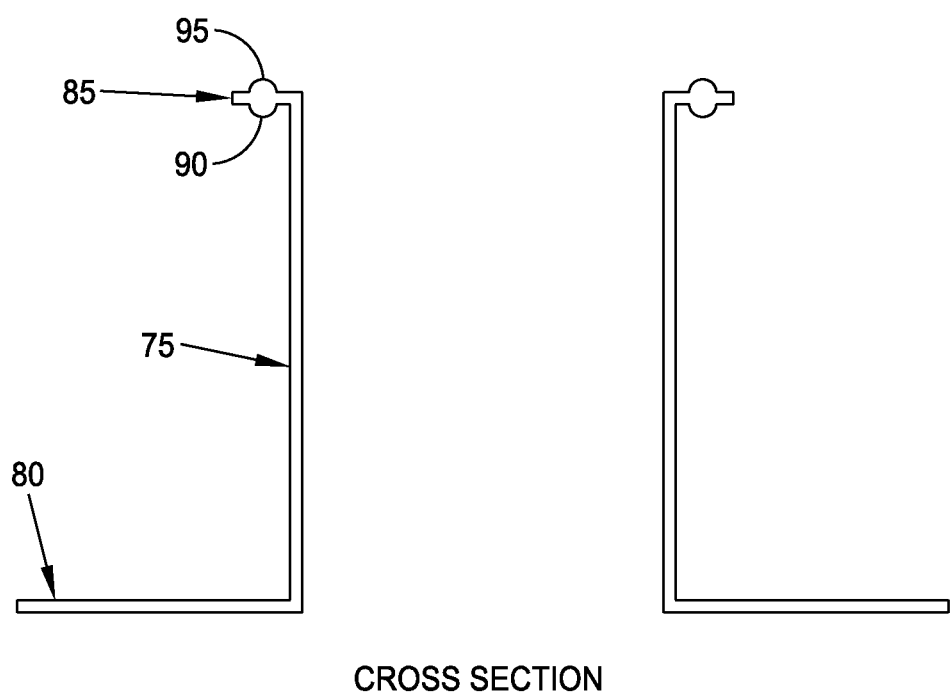
Figure 8:
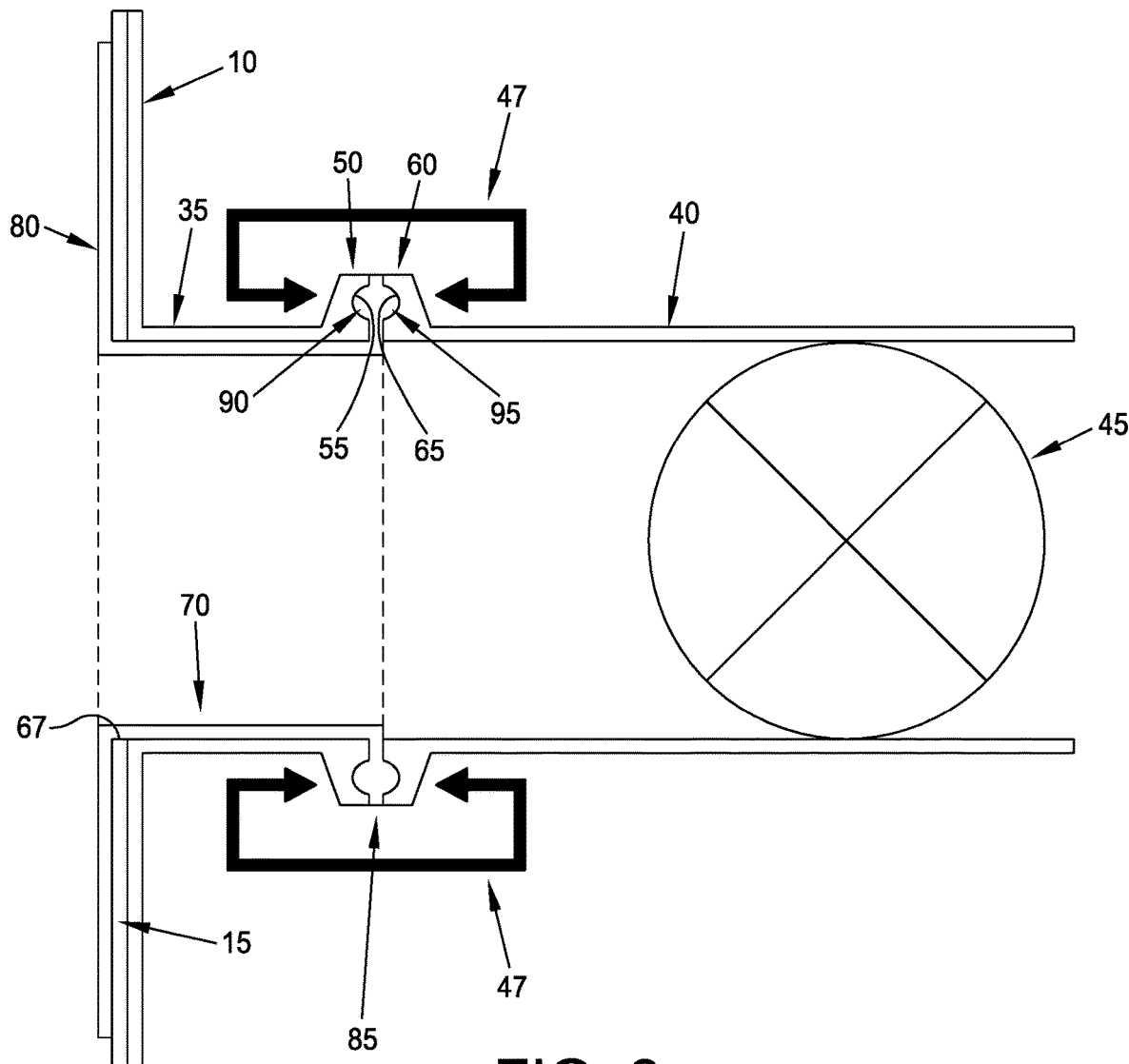
FIG. 8 is a schematic view showing the outer flange of the disposable inner plastic liner clamped between the first outlet pipe section of the outlet pipe of the reusable outer supporting container and the second outlet pipe section of the outlet pipe of the reusable outer supporting container (with one or more clamps being shown in schematic form)

In accordance with the present invention, and looking now at FIGS. 1-8, there is provided a novel container assembly 5 which comprises a reusable outer supporting container 10 and a disposable inner plastic liner 15. Reusable outer supporting container 10 has a removable top cover 20 for allowing disposable inner plastic liner 15 to be inserted into the interior of reusable outer supporting container 10. Reusable outer supporting container 10 has an outlet pipe 25 on its lower end for receiving a tubular outlet portion 30 of disposable inner plastic liner 15, with outlet pipe 25 having a valve (see below) disposed therein for selectively closing off flow through outlet pipe 25.

More particularly, outlet pipe 25 of reusable outer supporting container 10 comprises a first outlet pipe section 35 permanently affixed to reusable outer supporting container 10, and a second outlet pipe section 40 containing a valve 45, with first outlet pipe section 35 being releasably connected to second outlet pipe section 40 with a removable clamp 47 (shown in schematic form in FIGS. 1 and 8) of the sort well known in the art. In this way, second outlet pipe section 40, containing the aforementioned valve 45, can be easily disconnected from first outlet pipe section 35 (and hence can be easily disconnected from reusable outer supporting container 10) for cleaning and/or replacement purposes.

In accordance with the present invention, first outlet pipe section 35 comprises a flange 50 having a hemispherical recess 55 formed therein, and second outlet pipe section 40 comprises a flange 60 having a hemispherical recess 65 formed therein.

Disposable inner plastic liner 15 has an overall configuration selected to match the interior geometry of reusable outer supporting container 10, and comprises the aforementioned tubular outlet portion 30. In one preferred form of the invention, disposable inner plastic liner 15 comprises a hole 67 formed in the side wall of the disposable inner plastic liner, and tubular outlet portion 30 is formed by an independent member 70 which extends through hole 67 and is connected to disposable inner plastic liner 15 during manufacture. More particularly, in one preferred form of the invention, tubular outlet portion 30 comprises an intermediate tubular portion 75 having an inner flange 80 formed on one end and an outer flange 85 formed on its other end. Significantly, outer flange 85 comprises an inner hemispherical ring 90 and an outer hemispherical ring 95.

During assembly of disposable inner plastic liner 15, intermediate tubular portion 75 extends through hole 67 of disposable inner plastic liner 15, with inner flange 80 being positioned within disposable inner plastic liner 15 and being sealingly secured to the side wall thereof.

And during assembly of container assembly 5, intermediate tubular portion 75 of tubular outlet portion 30 of disposable inner plastic liner 15 is disposed within first outlet pipe section 35 of reusable outer supporting container 10; outer flange 85 of tubular outlet portion 30 is secured against flange 50 of first outlet pipe section 35, with inner hemispherical ring 90 of outer flange 85 disposed in hemispherical recess 55 of flange 50; and outer hemispherical ring 95 of outer flange 85 is seated in hemispherical recess 65 of flange 60 when second outlet pipe section 40 is clamped to first outlet pipe section 35. This arrangement provides a convenient and easy-to-use, yet highly effective, seal between first outlet pipe section 35 and second outlet pipe section 40.

On account of the foregoing construction, disposable inner plastic liner 15 can be positioned within the interior of reusable outer supporting container 10, with tubular outlet portion 30 of the disposable inner plastic liner being disposed in first outlet pipe section 35 of reusable outer supporting container 10, and with outer flange 85 of tubular outlet portion 30 being secured against flange 50 of first outlet pipe section 35, and with inner hemispherical ring 90 of outer flange 85 disposed in hemispherical recess 55 of flange 50. In addition, second outlet pipe section 40 can be clamped to first outlet pipe section 35, with outer hemispherical ring 95 of outer flange 85 being seated in hemispherical recess 65 of flange 60. As a result of this construction, first outlet pipe section 35 and second outlet pipe section 40 are fluidically sealed together so as to form the complete outlet pipe 25, with outlet pipe 25 being selectively closable via valve 45.

When novel container assembly 5 is to be used, valve 45 in outlet pipe 25 is closed off, and disposable inner plastic liner 15 is filled with the flowable material, with reusable outer supporting container 10 providing support for the weight of the flowable material contained within the disposable inner plastic liner. The flowable material can then be maintained within novel container assembly 5, e.g., for storage and/or shipping. When the flowable material is to thereafter be removed from novel container assembly 5, valve 45 in outlet pipe 25 is opened and the flowable material is dispensed out of the container assembly. Thereafter, disposable inner plastic liner 15 can be stripped out of reusable outer supporting container 10, a new disposable inner plastic liner 15 can be positioned within the interior of reusable outer supporting container 10, and fresh flowable material can be flowed into the disposable inner plastic liner.

Figure 9:
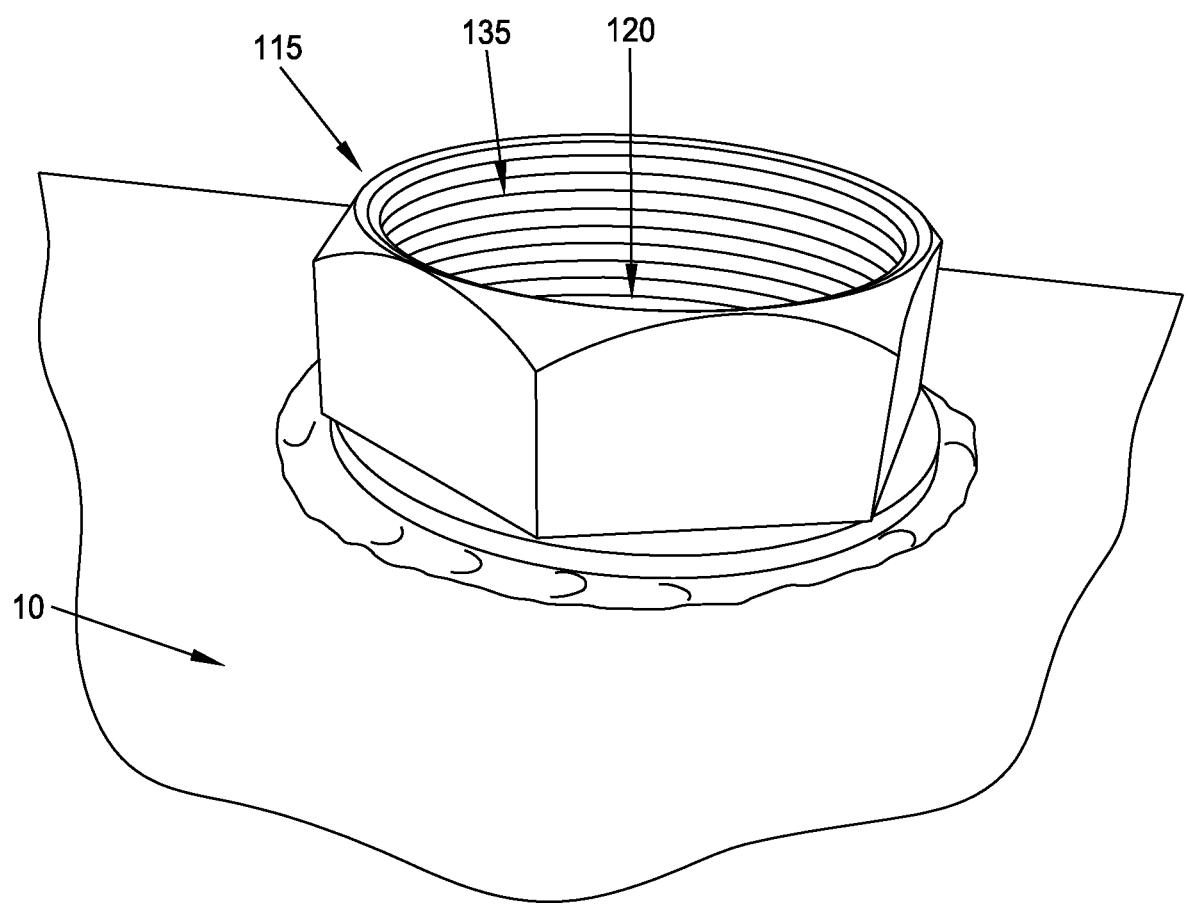
FIGS. 9-11 are schematic views showing a vacuum fitting which may be removably received in an opening in the reusable outer supporting container.
Figure 10:
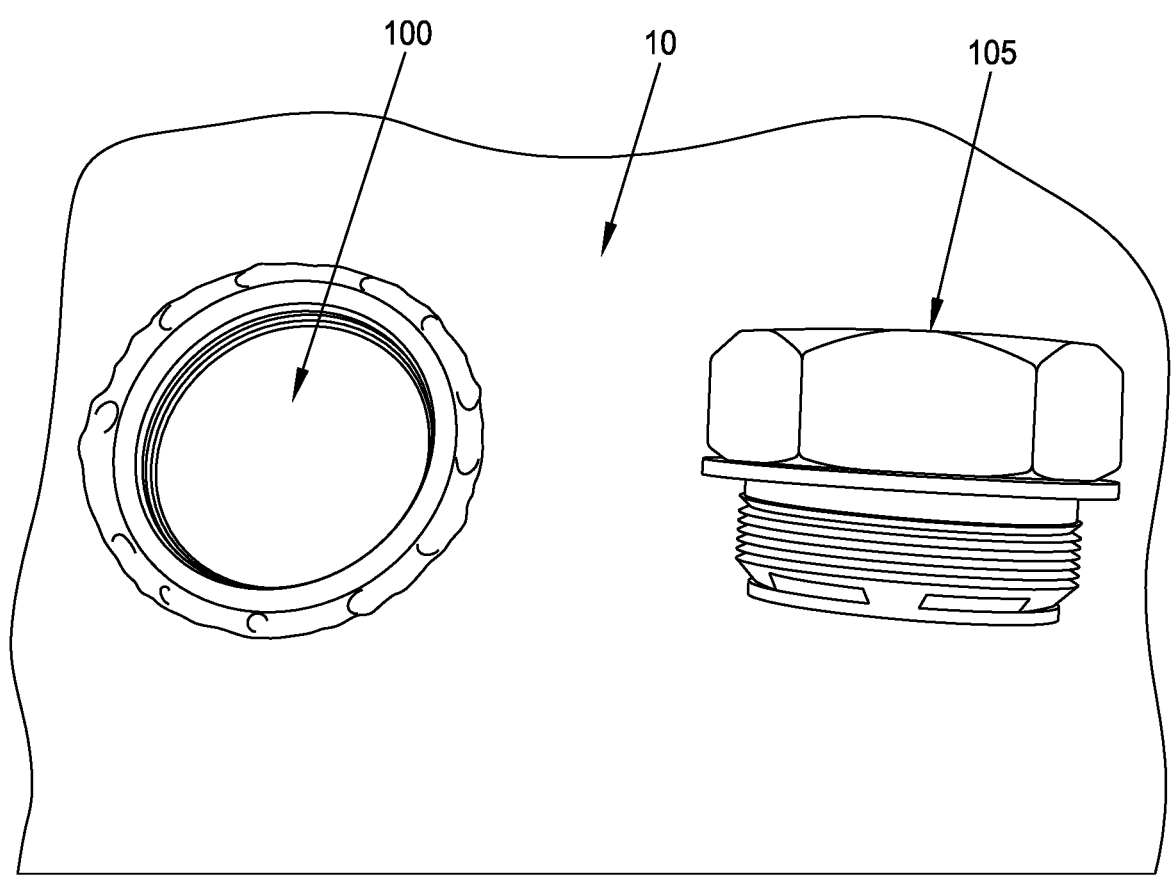
Figure 11:
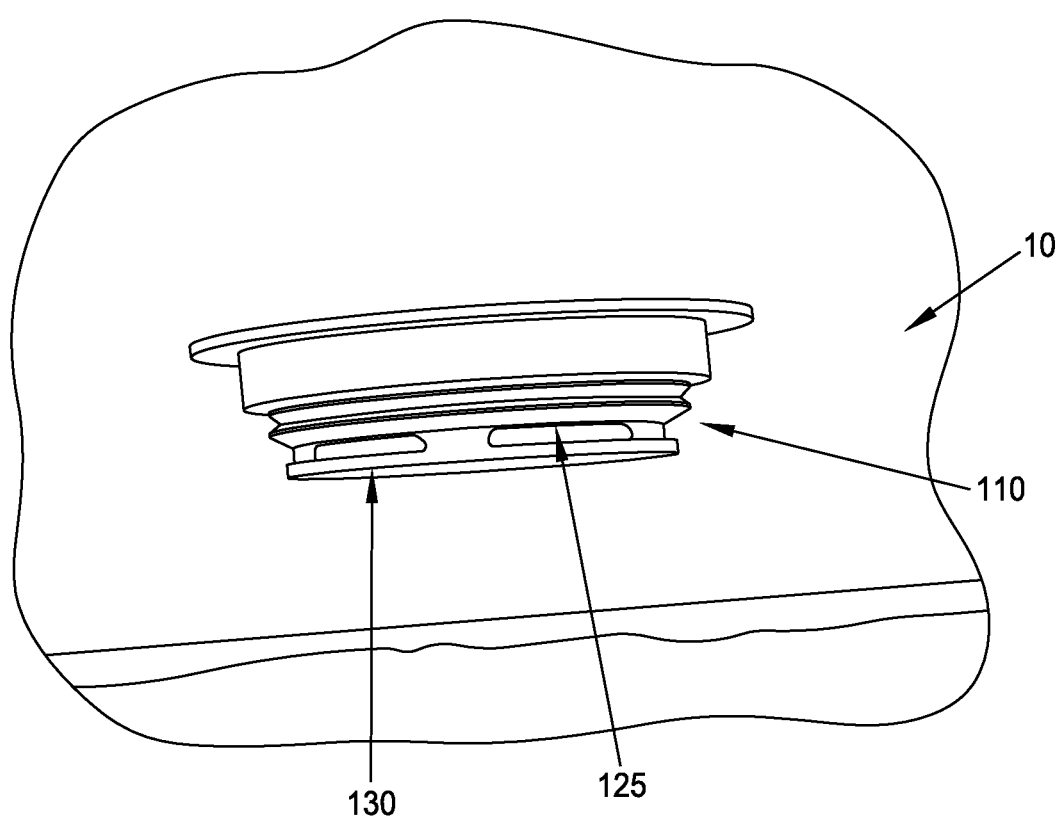

In addition to the foregoing, in order to facilitate installing disposable inner plastic liner 15 within the interior of reusable outer supporting container 10, it can be helpful to evacuate the air between disposable inner plastic liner 15 and reusable outer supporting container 10. To this end, and looking now at FIGS. 9-11, reusable outer supporting container 10 preferably comprises an opening 100 which receives a vacuum fitting 105 therein. Vacuum fitting 105 preferably comprises an inner end 110, an outer end 115, and a lumen 120 extending therebetween. Inner end 110 of vacuum fitting 105 comprises baffles 125 just inboard of an inner end surface 130. Outer end 115 of vacuum fitting 105 comprises screw threads 135. As a result of this construction, when vacuum fitting 105 is disposed in opening 100, and a vacuum source is thereafter connected to vacuum fitting 105 via screw threads 135, suction can be provided at the inner end of vacuum fitting 105, whereby to pull disposable inner plastic liner 15 against the interior wall of reusable outer supporting container 10. Significantly, if inner plastic liner 15 should obstruct the inner entrance of lumen 120, air flow will still be maintained through the vacuum fitting via baffles 125.

Modifications of the Preferred Embodiments

It should be understood that many additional changes in the details, materials, steps and arrangements of parts, which have been herein described and illustrated in order to explain the nature of the present invention, may be made by those skilled in the art while still remaining within the principles and scope of the invention.

By way of example but not limitation, hemispherical recess 55 and inner hemispherical ring 90, and/or hemispherical recess 65 and outer hemispherical ring 95, can have different cross-sectional configurations. By way of example but not limitation, hemispherical recess 55 and inner hemispherical ring 90, and/or hemispherical recess 65 and outer hemispherical ring 95, can have non-hemispherical configurations, e.g., square configurations, rectangular configurations, elliptical configurations, etc. Or hemispherical recess 55 and inner hemispherical ring 90, and/or hemispherical recess 65 and outer hemispherical ring 95, can have combinations of hemispherical and non-hemispherical configurations, provided, however, that the cross-sectional configurations of hemispherical recess 55 and inner hemispherical ring 90 are coordinated with one another, and the cross-sectional configurations of hemispherical recess 65 and outer hemispherical ring 95 are coordinated with one another.

Furthermore, second outlet pipe section 40 of outlet pipe 25 of reusable outer supporting container 10 may be releasably secured to first outlet pipe section 35 of outlet pipe 25 of reusable outer supporting container 10 using a means other than a releasable clamp, e.g., second outlet pipe section 40 may be releasably secured to first outlet pipe section 35 using a lock nut, a screw collar, etc.

These and other changes are considered to be within the scope of the present invention.

What is claimed is:

1. A container assembly for flowable materials, the container assembly comprising:
    a reusable outer supporting container; and
    a disposable inner plastic liner;
    wherein the reusable outer supporting container comprises:
        an outlet pipe comprising a first outlet pipe section connected to the reusable outer supporting container and a second outlet pipe section releasably connectable to the first outlet pipe section, wherein the second outlet pipe section comprises a valve for selectively closing off the second outlet pipe section, and wherein at least one of the first outlet pipe section and the second outlet pipe section comprises an annular recess; and
        an opening and a vacuum fitting removably disposed within the opening, wherein the vacuum fitting comprises an inner end, an outer end and a lumen extending therebetween, and further wherein the vacuum fitting comprises at least one baffle disposed between the inner end and the outer end;
    wherein the disposable inner plastic liner comprises a tubular outlet portion, wherein the tubular outlet portion comprises an outer flange configured to be captured between the first outlet pipe section and the second outlet pipe section, and further wherein the outer flange of the tubular outlet portion comprises an annular protrusion configured to be received in the annular recess when the outer flange is captured between the first outlet pipe section and the second outlet pipe section; and wherein the vacuum fitting of the reusable outer supporting container is disposed within the opening of the reusable outer supporting member such that when suction is provided through the vacuum fitting, the disposable inner plastic liner is pulled against an interior wall of the reusable outer supporting container.

2. Container assembly according to claim 1 wherein the annular recess comprises a hemispherical recess and the annular protrusion comprises a hemispherical ring.

3. A container assembly according to claim 1 wherein the first outlet pipe section and the second outlet pipe section both comprise annular recesses, and further wherein the outer flange of the tubular outlet portion comprises an annular protrusion on each side of the outer flange.

4. A container assembly according to claim 3 wherein each of the annular recesses comprises a hemispherical recess and each of the annular protrusions comprises a hemispherical ring.

5. A container assembly according to claim 1 wherein the first outlet pipe section comprises a flange and the second outlet pipe section comprises a flange, wherein the outer flange of the tubular outlet portion is configured to be captured between the flange of the first outlet pipe section and the flange of the second outlet pipe section, and further wherein at least one of the flange of the first outlet pipe section and the flange of the second outlet pipe section comprises the annular recess.

6. A container assembly according to claim 5 wherein the annular recess comprises a hemispherical recess and the annular protrusion comprises a hemispherical ring.

7. A container assembly according to claim 5 wherein the flange of the first outlet pipe section and the flange of the second outlet pipe section both comprise annular recesses, and further wherein the outer flange of the tubular outlet portion comprises an annular protrusion on each side of the outer flange.

8. A container assembly according to claim 7 wherein each of the annular recesses comprises a hemispherical recess and each of the annular protrusions comprises a hemispherical ring.

9. A container assembly according to claim 1 wherein the disposable inner plastic liner comprises a hole, wherein the tubular outlet portion comprises an inner flange, and further wherein the inner flange is disposed within the disposable inner plastic liner and sealingly secured thereto.

10. A container assembly according to claim 1 wherein the opening is threaded and the vacuum fitting is threaded.

11. A container assembly according to claim 1 wherein the reusable outer supporting container comprises a removable top cover.

12. A method for storing and releasing flowable materials, the method comprising:
   providing a container assembly comprising:
      a reusable outer supporting container; and
      a disposable inner plastic liner;
      wherein the reusable outer supporting container comprises;
         an outlet pipe comprising a first outlet pipe section connected to the reusable outer supporting container and a second outlet pipe section releasably connectable to the first outlet pipe section, wherein the second outlet pipe section comprises a valve for selectively closing off the second outlet pipe section, and wherein at least one of the first outlet pipe section and the second outlet pipe section comprises an annular recess; and
         an opening and a vacuum fitting removably disposed within the opening, wherein the vacuum fitting comprises an inner end, an outer end and a lumen extending therebetween, and further wherein the vacuum fitting comprises at least one baffle disposed between the inner end and the outer end;
      wherein the disposable inner plastic liner comprises a tubular outlet portion, wherein the tubular outlet portion comprises an outer flange configured to be captured between the first outlet pipe section and the second outlet pipe section, and further wherein the outer flange of the tubular outlet portion comprises an annular protrusion configured to be received in the annular recess when the outer flange is captured between the first outlet pipe section and the second outlet pipe section;
   positioning the disposable inner plastic liner within the reusable outer supporting container, with the tubular outlet portion of the disposable inner plastic liner being disposed within the outlet pipe so that the outer flange of the tubular outlet portion is captured between the first outlet pipe section and the second outlet pipe section, and with the annular protrusion of the disposable inner plastic liner being received in the annular recess of the outlet pipe;
   providing suction through the vacuum fitting to pull the disposable inner plastic liner against an inner wall of the reusable outer supporting container;
   loading flowable material into the disposable inner plastic liner while the valve of the outlet pipe is closed; and
   releasing the flowable material from the disposable inner plastic liner by opening the valve of the outlet pipe.

* * * * *